Feb. 7, 1967  H. R. HOLT  3,302,789
MEANS AND METHOD OF MAINTAINING A FISH ENVIRONMENT
Filed July 1, 1964
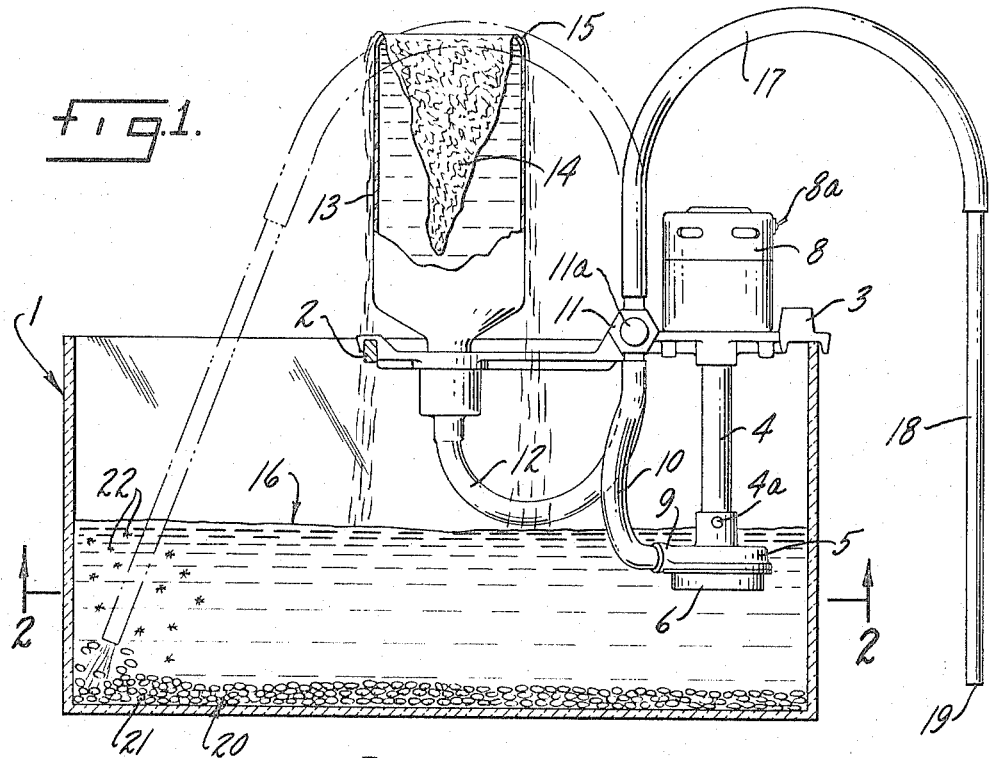
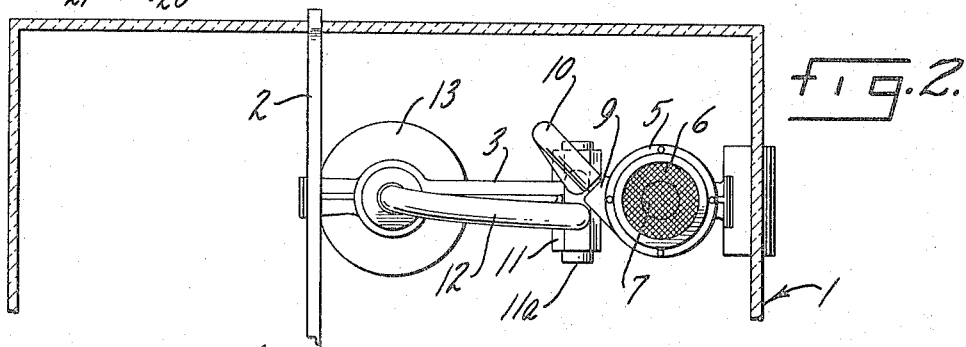
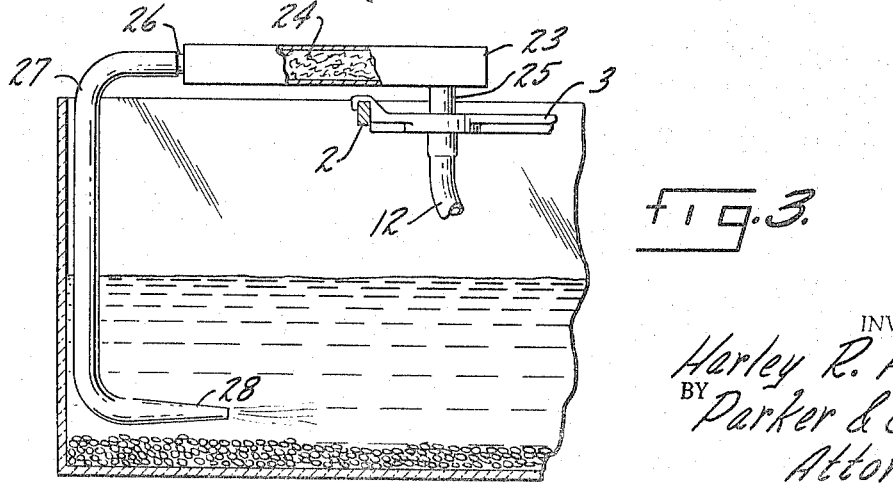
INVENTOR.
Harley R. Holt,
BY Parker & Carter
Attorneys.

United States Patent Office 3,302,789
Patented Feb. 7, 1967

3,302,789
MEANS AND METHOD OF MAINTAINING A FISH ENVIRONMENT
Harley R. Holt, River Forest, Ill., assignor to Ray-Wayland Corporation, Chicago, Ill., a corporation of Illinois
Filed July 1, 1964, Ser. No. 379,600
14 Claims. (Cl. 210—70)

This invention relates to a method and to an assembly effective to maintain a proper fish environment, and has particular relation to the maintenance of a clean fish environment.

One purpose of the invention is to provide a means for cleaning a body of water.

Another purpose is to provide a means for cleaning a body of water and for aerating said body.

Another purpose is to provide a means and method for cleaning the gravel bed of a fish tank.

Another purpose is to provide a means and method for cleaning both the gravel bed and the body of water in a fish tank.

Another purpose is to provide a method of cleaning a gravel bed in a water tank wherein deleterious materials are removed from gravel particles through the mediacy, in part, of the particles themselves.

Another purpose is to provide a method of cleaning a fish environment which includes the removal of deleterious materials from a gravel bed, the transfer of said materials to a body of water and the subsequent removal of said materials from said body of water.

Another purpose is to provide a rapid and economical means and method of cleaning a gravel bed and a body of water in fish tanks and the like.

Another purpose is to provide a rapid, simple and economical method of cleaning gravel and of cleaning and aerating a body of water.

Another purpose is to provide a means of cleaning a body of water including means for agitating said body.

Another purpose is to provide a method of cleaning a body of water including the agitation of said body of water through the mediacy, in part, of said water.

Another purpose is to provide a gravel and water cleaning structure of maximum simplicity and economy.

Other purposes will appear from time to time during the course of the specification and claims.

The invention is illustrated more or less diagrammatically in the accompanying drawings, wherein:

FIGURE 1 is a side view;

FIGURE 2 is a view taken on the line 2—2 of FIGURE 1; and

FIGURE 3 is a detailed view illustrating a variant form of an element of the invention.

Like parts are indicated by like numerals throughout the specification and drawings.

Referring now to the drawings, and particularly to FIGURE 1, the numeral 1 generally designates a tank. The tank has a bottom wall, a set of four joined side walls and an upwardly normally open top area. While the invention is described herein as applicable to a fish tank, it will be understood that the means and method set forth herein may be employed in the maintenance of similar environments without departing from the nature and scope of the invention.

A brace member 2 extends between and rests upon a pair of parallel side walls of the tank 1 intermediate the remaining side walls thereof. Resting upon one of the side walls of the tank 1 and upon the brace 2 is a support member 3. Depending from the support member 3 is a shaft housing 4. An impeller housing 5 is carried by the distal end of the shaft housing 4. Openings 4a in shaft housing 4 permit escape of any water entering housing 4 past impeller 5. A screen 6 is mounted on the housing 5 and overlies a water ingress opening 7 in the lower surface of the housing 5. A power means, such as the electric motor 8, is carried by support 3 and has a driving relationship with a shaft and impeller (not shown) positioned respectively for rotation within housings 4, 5.

An impeller housing outlet 9 has communicating therewith a conduit 10. The conduit 10 in turn communicates with a valve housing 11 carried by support 3. A second flexible conduit 12 extends from valve housing 11 to and for communication with a filter housing 13. The particular structure of the internal valve elements within housing 11 form no specific part of the invention and will not, therefore, be illustrated or further described, it being understood that any suitable valve mechanism may be employed, along with a suitable operating mechanism such as the manually operable valve portion 11a illustrated as extending outwardly from the housing 11. Within filter housing 13 is a filter bed 14, which may conveniently be formed of any suitable water-filtering materials, such as glass wool, cotton fibers or the like. The housing 13 has an upwardly open end 15 through which water which has been filtered by medium 14 is free to flow. It will be noted that water flowing outwardly from opening 15 is free to flow or cascade down about the outer surface of housing 13 for return to the body of water 16 within the tank 1. A third conduit 17 communicates with the valve housing 11 and with a hollow rod or wand 18, the outer end 19 of which is open. The conduit 17 is movable and may be conveniently formed of flexible material.

A gravel bed 20 is present on the floor or upper surface of the bottom wall of tank 1 and includes a plurality of individual gravel particles 21. Illustrated in FIGURE 1 is a plurality of dirt or other deleterious particles 22.

Referring now to FIGURE 3, a variant form of filter housing is illustrated. In the form illustrated in FIGURE 3 a filter housing 23 is relatively flat and extends across a portion of the upper surface of water body 16. The housing 23 contains a filter medium 24 and does not have an open end, such as the open end 15 illustrated in FIGURE 1. The housing 23 has an inlet 25 for communication with conduit 12 and an outlet 26 for communication with a conduit 27. The conduit 27 extends from the filter housing 23 downwardly into body 16 and has a nozzle outlet 28 directed in substantially parallel relationship with the bottom wall of housing 1 in upwardly spaced relationship therewith. While the housing 23 is illustrated in a form particularly suitable for use with installations in which limited space is available above the body of water 1, it will be understood that the housing 23 could take a wide variety of forms and could be located alongside of or remotely from the tank 1 without departing from the nature and scope of the invention, the conduits 12 and 27 being accordingly adjusted in length and shape to accommodate such placement.

Whereas there has been shown and described in operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

When the operator desires to clean the fish environment in tank 1, a manually operable switch 8a, for example, is moved to activate power means 8 and thus to turn the impeller or water pump element within housing 5. Thereupon water from body 16 is drawn through screen 6 into the housing 5 and is directed under pressure therefrom through conduit 10 to valve housing 11. With the valve parts within housing 11 in one position, the water delivered to housing 11 from conduit 10 is directed through conduit 12 and into and through filter housing 13 and filter medium 14. In that form of the invention illustrated in FIGURES 1 and 2 the water, having been filtered in housing 13, is directed outwardly therefrom through the opening 15 and is cascaded downwardly thereabout for return to the body 16. During the cascade action of the cleaned water about the housing 13 an aeration of the cascading water takes place and the clean water thus returned to the tank 1 will have acquired a desirable oxygenation.

When the operator desires to clean the gravel particles 21 of the gravel bed 20, the manually operable valve portion 11a is moved to adjust the valve parts in housing 11 and to place the conduit 10 in communication with the conduit 17 through the valve housing 11 and to break communication therethrough between conduits 10 and 12. Water is thus delivered under pressure through conduit 17 and wand 18 for delivery, in the form of a relatively powerful jet, through the opening 19. As illustrated in dotted lines in FIGURE 1, the wand is inserted into the body 1 and placed into and adjacent the gravel particles 21 of the bed 20. The extent of agitation, dispersal and movement of the particles 21 may be controlled by the operator through varying the distance of the outlet 19 from the particles to be cleaned. When relatively little dislodgement is required, for example when plant life is present in or on the gravel bed 20, the operator holds the outlet 19 of wand 18 closely adjacent the bed 20 in the bottom wall of tank 1. In areas where more freedom of action is permitted, the operator holds the outlet 19 in greater spaced relation to the bed 20, as illustrated.

The agitation of particles 21 causes the same to rub against each other and to dislodge deleterious particles, such as those illustrated at 22, from the gravel particles 21 and to disperse said deleterious particles in the body of water 16. When the wand 18 has been moved throughout the gravel bed 20 and the particles 21 thereof have been substantially cleaned, the body of water 16 will become cloudy and dirty and will have been rendered unsatisfactory. Thereupon the operator moves the valve control 11a to reposition the internal valve parts within housing 11 and to reinstate communication between conduits 10 and 12 and to break communication between conduits 10 and 17, whereupon the body of water 16 is again passed through pump 5, conduit 10, valve housing 11, conduit 12 and filter mechanism 13, 14.

While the foregoing operation of the device has been described in a sequence wherein the water is first cleaned, the gravel bed 20 is then cleaned and the water is re-cleaned, it will be understood that the steps may be varied in that the gravel bed 20 may be first cleaned and the body of water 16 thereafter cleaned as described. It will be further understood that, upon cleaning of the body of water 16, it may be that the gravel bed 20 will be seen to require additional cleaning, in which case the process described is simply repeated.

In the method of the invention, therefore, it will be seen that the gravel particles 21 are cleaned by agitating the same through the mediacy of a jet of water directed thereagainst, the said water having been drawn from the body of water above and about the gravel bed and returned thereto under pressure. The deleterious particles thus dislodged from the gravel particles 21 are delivered to the body of water and carried in suspension therein. Thereafter the body of water is itself cleaned to remover said deleterious perticles therefrom and to deliver the same to a filter body for retention therein and eventual discard therewith. It will be observed also that the method of cleaning the body of water illustrated in FIGURES 1 and 2 includes the step of aerating the filtered water during its return to the body to be cleaned.

Referring now to the form of the invention illustrated in FIGURE 3, it will be observed that water passing through housing 5, conduit 10, valve housing 11 and conduit 12 is delivered to a filter housing 23. Within the housing 23 deleterious particles are removed from the water and caught by and within the filter medium 24. Thereafter filtered or cleaned water is returned through conduit 27 and is delivered, under pressure, through a jet nozzle, such as that illustrated at 28. The delivery of water under pressure outwardly through nozzle 28 below the surface of water body 16 serves to agitate the water body 16 for dislodgement of some deleterious particles carried by the inner surfaces of the walls of, or other structures within tank 1 and delivery of said particles with the water flowing through screen 6 into housing 5, it being understood that the screen 6 is present for prevention of ingress into housing 5 by relatively small fish, the screen 6 being of sufficiently wide mesh to permit passage of deleterious particles therethrough. Thus the method of the structure illustrated in FIGURE 3 includes the step of agitating the water during the cleansing process.

What is claimed is:

1. A water cleansing structure for fish tanks and the like including a support, a water pump carried on said support for extension into the body of water to be cleaned, a filter medium carried by said support above said body of water, a conduit communicating said pump with said filter medium, said filter medium having an upwardly open end for delivery of filtered water therethrough and for delivery through atmosphere by gravity therefrom to said body of water, a second conduit and means for placing said pump in communication with said second conduit, said second conduit having a flexible portion and an open end positionable within and adjacent the bottom of said body of water.

2. Means for cleaning a body of water and a gravel bed therein including a pump and means to position said pump in said body of water, a valve means, a conduit communicating said pump and said valve means, a filter body, a second conduit communicating said valve means with said filter body, a third open-ended conduit communicating with said valve means, said valve means being operable to place said pump in communication therethrough with said filter body and alternately to place said pump in communication therethrough with said third conduit, the open end of said third conduit being positionable adjacent said gravel bed.

3. Means for cleaning a body of water and a gravel bed therein including a pump and means to position said pump in said body of water, a valve means, a conduit communicating said pump and said valve means, a filter body, a second conduit communicating said valve means with said filter body, a third open-ended conduit communicating with said valve means, said valve means being operable to place said pump in communication therethrough with said filter body and alternately to place said pump in communication therethrough with said third conduit, the open end of said third conduit being positionable adjacent said gravel bed, and power means drivingly engaging said pump.

4. Means for cleaning a body of water and a gravel bed therein including a tank containing said body of water, a support carried on said tank above said body of water, a pump, said support positioning said pump in said body of water, a valve means, a conduit communicating said pump and said valve means, a filter body, a second conduit communicating said valve means with said filter body, a third open-ended conduit communicating with said valve means, said valve means being operable to place said pump in communication therethrough with said filter body and alternately to place said pump in communication therethrough with said third conduit, the open end of said third conduit being positionable adjacent said gravel bed, said valve means, filter body and pump being carried by said support.

5. Means for cleaning a body of water and a gravel bed therein including a pump and means to position said pump in said body of water, a valve means, a conduit communicating said pump and said valve means, a filter body, a second conduit communicating said valve means with said filter body, a third open-ended conduit communicating with said valve means, said valve means being operable to place said pump in communication therethrough with said filter body and alternately to place said pump in communication therethrough with said third conduit, the open end of said third conduit being positionable adjacent said gravel bed, said filter body having an open end positioned above said water body whereby the water is cascaded down through atmosphere by gravity from said open end to said body of water.

6. Means for cleaning a body of water and a gravel bed therein including a pump and means to position said pump in said body of water, a valve means, a conduit communicating said pump and said valve means, a filter body, a second conduit communicating said valve means with said filter body, a third open-ended conduit communicating with said valve means, said valve means being operable to place said pump in communication therethrough with said filter body and alternately to place said pump in communication therethrough with said third conduit, the open end of said third conduit being positionable adjacent said gravel bed, a fourth conduit communicating with said filter body and extending into said water body whereby clean water from said filter body is directed through said fourth conduit for discharge under pressure below the surface of said body of water.

7. The method of cleaning a gravel bed within a body of water which comprises the steps of withdrawing water from said body, delivering said withdrawn water under pressure against said gravel bed within said body of water to agitate the particles of said gravel bed, discharging deleterious particles from said gravel particles into said body of water.

8. The method of cleaning a gravel bed within a body of water which comprises the steps of withdrawing water from said body, delivering said withdrawn water under pressure against said gravel bed within said body of water to agitate the particles of said gravel bed, discharging deleterious particles from said gravel particles into said body of water, and thereafter continuing to withdraw water from said water body, pumping said withdrawn portion through a filter medium and returning said withdrawn water to said body.

9. The method of cleaning a gravel bed within a body of water which comprises the steps of withdrawing a portion of said body of water, subjecting said withdrawn portion to pressure, directing said withdrawn portion under pressure against said gravel bed to agitate gravel particles therein against each other and to dislodge deterious particles from said gravel particles.

10. The method of cleaning a gravel bed within a body of water which comprises the steps of withdrawing a portion of said body of water, subjecting said withdrawn portion to pressure, directing said withdrawn portion under pressure against said gravel bed to agitate gravel particles therein against each other and to dislodge deteterious particles from said gravel particles, suspending said dislodged deteterious particles in said body of water and thereafter cleaning said body of water.

11. The method of cleaning a gravel bed within a body of water which comprises the steps of withdrawing a portion of said body of water, subjecting said withdrawn portion to pressure, directing said withdrawn portion under pressure against said gravel bed to agitate gravel particles therein against each other and to dislodge deleterious particles from said gravel particles, and thereafter continuing to withdraw a portion of said body of water and directing said withdrawn portion through a filter medium.

12. The method of cleaning a gravel bed within a body of water which comprises the steps of withdrawing a portion of said body of water, subjecting said withdrawn portion to pressure, directing said withdrawn portion under pressure against said gravel bed to agitate gravel particles therein against each other and to dislodge deleterious particles from said gravel particles, and thereafter continuing to withdraw a portion of said body of water and directing said withdrawn portion through a filter medium, and returning said withdrawn water from said filter medium to said body of water.

13. The method of cleaning a gravel bed within a body of water which comprises the steps of withdrawing a portion of said body of water, subjecting said withdrawn portion to pressure, directing said withdrawn portion under pressure against said gravel bed to agitate gravel particles therein against each other and to dislodge deleterious particles from said gravel particles, and thereafter continuing to withdraw a portion of said body of water and directing said withdrawn portion through a filter medium, and returning said withdrawn water from said filter medium to said body of water by gravity through atmosphere.

14. The method of cleaning a gravel bed within a body of water which comprises the steps of withdrawing a portion of said body of water, subjecting said withdrawn portion to pressure, directing said withdrawn portion under pressure against said gravel bed to agitate gravel particles therein against each other and to dislodge deleterious particles from said gravel particles, and thereafter continuing to withdraw a portion of said body of water and directing said withdrawn portion through a filter medium, and returning said withdrawn water from said filter medium to said body of water in the form of a pressurized jet below the surface of said body of water.

References Cited by the Examiner

UNITED STATES PATENTS

| | | | |
|---|---|---|---|
| 2,137,397 | 11/1938 | Haldeman. | |
| 2,275,428 | 3/1942 | Haldeman. | |
| 2,335,756 | 11/1943 | Haldeman. | |
| 2,533,936 | 12/1950 | Holmes et al. | |
| 2,674,574 | 4/1954 | Pettas | 210—169 |
| 2,979,733 | 4/1961 | Saint Clair et al. | 210—169 X |
| 3,039,612 | 6/1962 | Palmer et al. | 210—280 X |
| 3,045,829 | 7/1962 | Rule et al. | 210—169 |
| 3,074,078 | 1/1963 | Varian. | |
| 3,078,998 | 2/1963 | Blumenfeld | 210—169 |
| 3,216,575 | 11/1965 | Stuart | 210—280 |
| 3,217,886 | 11/1965 | Ruston | 210—169 |
| 3,225,930 | 12/1965 | Willinger | 210—169 X |
| 3,247,969 | 4/1966 | Miller | 210—169 |

REUBEN FRIEDMAN, *Primary Examiner.*

D. M. RIESS, *Assistant Examiner.*